(12) United States Patent
Moriya et al.

(10) Patent No.: US 11,200,683 B2
(45) Date of Patent: Dec. 14, 2021

(54) IMAGE PROCESSING DEVICE AND IMAGE PROCESSING METHOD

(71) Applicant: Mitsubishi Electric Corporation, Tokyo (JP)

(72) Inventors: Yoshimi Moriya, Tokyo (JP); Naohiro Shibuya, Tokyo (JP); Kazuo Sugimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 133 days.

(21) Appl. No.: 16/635,969

(22) PCT Filed: Aug. 22, 2017

(86) PCT No.: PCT/JP2017/029884
§ 371 (c)(1),
(2) Date: Jan. 31, 2020

(87) PCT Pub. No.: WO2019/038821
PCT Pub. Date: Feb. 28, 2019

(65) Prior Publication Data
US 2020/0242782 A1 Jul. 30, 2020

(51) Int. Cl.
*G06K 9/62* (2006.01)
*G06T 7/246* (2017.01)
(Continued)

(52) U.S. Cl.
CPC ............ *G06T 7/246* (2017.01); *G06K 9/46* (2013.01); *G06K 9/6215* (2013.01); *G06T 7/73* (2017.01)

(58) Field of Classification Search
CPC .......... G06T 7/246; G06T 7/73; G06T 7/292; G06T 7/00; G06K 9/46; G06K 9/6215;
(Continued)

(56) References Cited

U.S. PATENT DOCUMENTS 7,743,330 B1 * 6/2010 Hendricks .............. G11B 27/28
715/723
8,542,276 B2 * 9/2013 Huang .................... G06T 7/292
348/152
(Continued)

FOREIGN PATENT DOCUMENTS

JP 2006-31678 A 2/2006
JP 2015-191426 A 11/2015
(Continued)

OTHER PUBLICATIONS

Ahmed et al., "An Improved Deep Learning Architecture for Person Re-Identification", in Computer Vision and Pattern Recognition (CVPR), 2015, total of 9 pages.
(Continued)

*Primary Examiner* — Sheela C Chawan
(74) *Attorney, Agent, or Firm* — Birch, Stewart, Kolasch & Birch, LLP

(57) ABSTRACT

An image processing device (100) includes an object detecting unit (103a) that detects objects each appearing in a corresponding one of pieces of image data; an object tracking unit (103b) that tracks the detected objects in a time direction; a descriptor generating unit (104) that generates feature descriptors of the respective objects on the basis of results of the detection and results of the tracking of the objects; a data recording control unit (105) that forms a database from the generated feature descriptors and the pieces of image data of the objects corresponding to the feature descriptors; an image retrieving unit (108a) that retrieves, from the database, object groups that match a retrieval condition and form a pair of object groups appearing in pieces of image data obtained by capturing different regions, each of the object groups corresponding to a corresponding one of the regions; a feature extracting unit (108b) that extracts a feature to be used for checking, from pieces of image data and feature descriptors of each of the retrieved object groups; and a determining unit (108c) that determines whether the object groups forming the pair of
(Continued)

object groups are identical to each other, by checking the extracted features against each other.

3 Claims, 6 Drawing Sheets

(51) Int. Cl.
*G06T 7/73* (2017.01)
*G06K 9/46* (2006.01)

(58) Field of Classification Search
CPC ............ G06K 9/6218; G06K 9/00771; G06K 9/00677; G06F 16/53
USPC ........ 382/103, 107, 115, 117, 118, 128, 181, 382/190, 199, 209, 218, 219, 224, 225, 382/232, 238, 242, 294, 312
See application file for complete search history.

(56) References Cited

U.S. PATENT DOCUMENTS

| | | | | |
|---|---|---|---|---|
| 8,717,405 | B2* | 5/2014 | Li | H04N 13/243 348/14.08 |
| 2005/0265603 | A1* | 12/2005 | Porter | G06K 9/00295 382/190 |
| 2011/0141288 | A1 | 6/2011 | Huang et al. | |
| 2017/0323481 | A1* | 11/2017 | Tran | H04N 5/23212 |
| 2018/0033153 | A1* | 2/2018 | Hirasawa | G06K 9/00 |

FOREIGN PATENT DOCUMENTS

| | | |
|---|---|---|
| JP | 2016-143335 A | 8/2016 |
| JP | 2016-154306 A | 8/2016 |
| TW | 201120408 A1 | 6/2011 |

OTHER PUBLICATIONS

International Search Report issued in PCT/JP2017/029884 (PCT/ISA/210), dated Nov. 7, 2017.
Liao et al., "Person Re-Identification by Local Maximal Occurrence Representation and Metric Learning", in Computer Vision and Pattern Recognition (CVPR), 2015, total of 10 pages.
Taiwan Office Action dated Aug. 24, 2018 for Taiwan Patent Application No. 107102185 with English Translation.
Taiwan Office Action dated Dec. 28, 2018 for Taiwan Patent Application No. 107102185 with English Translation.
You et al., "Top-push Video-based Person Re-Identification", in Computer Vision and Pattern Recognition (CVPR), 2016, total of 9 pages.

* cited by examiner

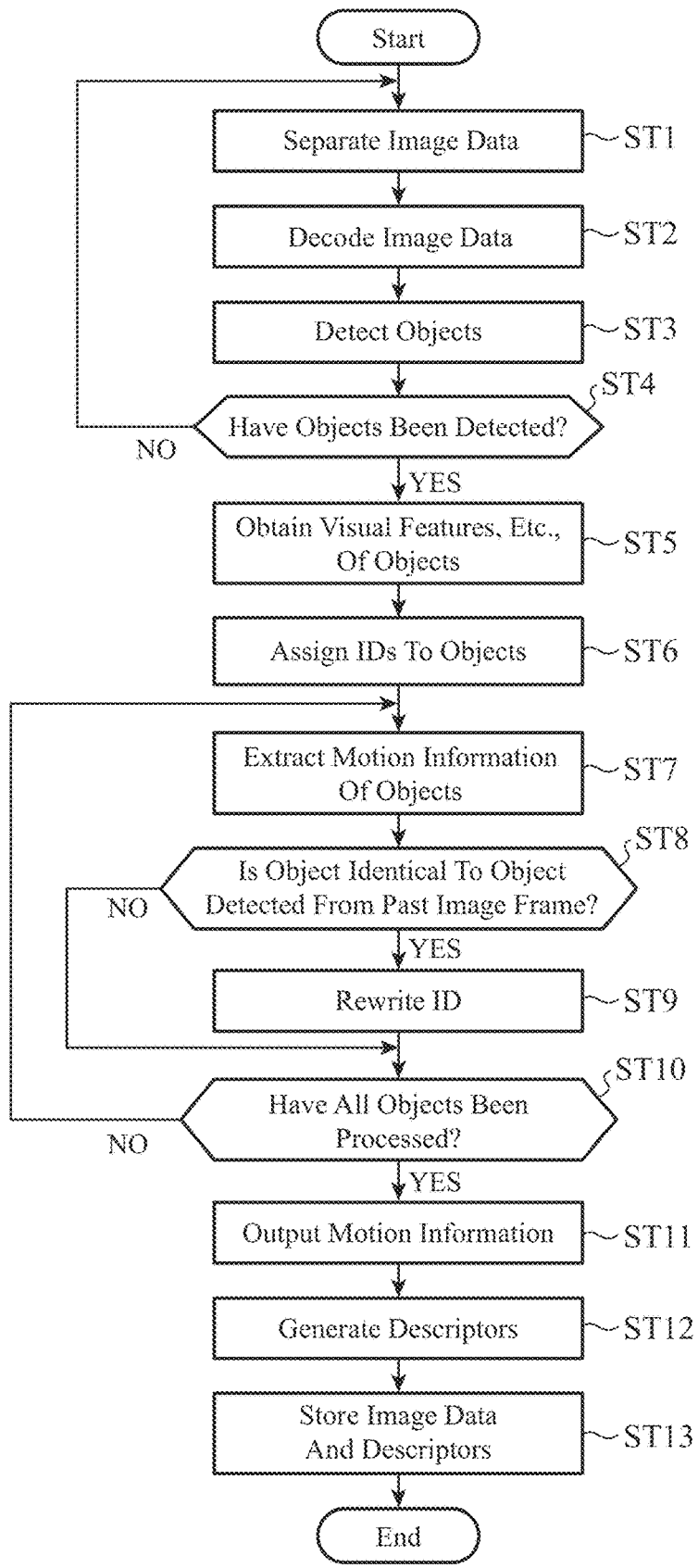

IMAGE PROCESSING DEVICE AND IMAGE PROCESSING METHOD

TECHNICAL FIELD

The invention relates to an image processing technique for analyzing whether objects shot by a plurality of cameras are identical objects.

BACKGROUND ART

Conventional methods for estimating whether objects shot by a plurality of cameras are identical objects are disclosed in, for example, Non-Patent Literature 1 and Non-Patent Literature 2.

In Non-Patent Literature 1, a rectangular region including person images is divided into sub-windows, and a color histogram and a texture histogram are generated as features on a per divided sub-window basis. Furthermore, a data set is prepared that is obtained by collecting person images for learning which are assigned labels indicating whether persons are identical persons, vectors of the above-described features are generated from the person images for learning, and distance learning is performed. In the distance learning, weight parameters are learned in such a manner that a distance between the vectors of features of a pair of identical person images is small, and weight parameters are learned in such a manner that a distance between the vectors of features of a pair of non-identical person images is large.

In Non-Patent Literature 2, features are extracted from person images using a neural network, and a determination as to whether a pair of person images are identical persons is made using vectors of the features generated by the neural network.

In the conventional method disclosed in the above-described Non-Patent Literature 1 or Non-Patent Literature 2, a determination as to whether persons are identical persons is made by comparing a pair of person images which are still images. Meanwhile, in the actual environment, there is a need, for example, to identify a sequence of person images from a moving image which is shot by a surveillance camera, and compare the identified sequence of person images with a sequence of person images of a moving image shot by another surveillance camera, to determine whether persons are identical persons. A conventional method for estimating whether objects are identical objects from a moving image is disclosed in, for example, Non-Patent Literature 3.

In Non-Patent Literature 3, color and texture histograms of person images in a sequence are generated as features, the generated features are averaged in the sequence, and the averaged feature is used as a feature of the sequence of the person images. By averaging the features in the sequence, changes in features caused by a background or occlusion are removed, and thus a robust feature of the person images is generated.

CITATION LIST

Patent Literatures

Non-Patent Literature 1: S. Liao, Y. Hu, X. Zhu, S. Z. Li, "Person re-identification by local maximal occurrence representation and metric learning", In Computer Vision and Pattern Recognition (CVPR), 2015.

Non-Patent Literature 2: E. Ahmed, M. Jones, T. K. Marks, "An improved deep learning architecture for person re-identification," In Computer Vision and Pattern Recognition (CVPR), 2015.

Non-Patent Literature 3: J. You, A. Wu, X. Li, and W.-S. Zheng, "Top-push video-based person re-identification," in Computer Vision and Pattern Recognition (CVPR), 2016.

SUMMARY OF INVENTION

Technical Problem

When shooting is performed by a plurality of cameras, even if the same person is shot, for example, the way the person carries his/her bag may change at some point in time, or belongings, etc., of the person may or may not be caught on the cameras depending on the installation locations of the cameras and the direction of movement of the person. In this case, a technique disclosed in the above-described Non-Patent Literature 3 has a problem in which while averaging features obtained from respective person images in a sequence enables changes in features caused by a background or occlusion to be removed, the averaging may cause features that are effective for determining whether persons are identical persons to be ignored.

An image processing device according to the invention includes image processing circuitry to detect objects each appearing in a corresponding one of pieces of image data, by analyzing the pieces of image data; to track the objects detected, in a time direction; to generate feature descriptors of the respective objects on the basis of results of the detection and results of the tracking; to form a database from the feature descriptors generated and the pieces of image data of the objects corresponding to the feature descriptors; to retrieve, from the database formed, object groups that match a set retrieval condition and form a pair of object groups appearing in pieces of image data obtained by capturing different regions, each of the object groups corresponding to a corresponding one of the regions; to extract a feature to be used for checking, from pieces of image data and feature descriptors of each of the object groups retrieved; and to determine whether the object groups forming the pair of object groups are identical to each other, by checking features against each other, each of the features being extracted, in which the processing circuitry performs feature-based clustering between the pieces of image data of each of the retrieved object groups, using the pieces of image data and the feature descriptors of a corresponding one of the object groups retrieved, and extracts, from pieces of image data in a cluster defined by a result of the clustering, one feature for the cluster, the one feature being the feature to be used for checking.

Solution to Problem

An image processing device according to the invention includes an object detecting unit for detecting objects each appearing in a corresponding one of pieces of image data, by analyzing the pieces of image data; an object tracking unit for tracking the objects detected by the object detecting unit, in a time direction; a descriptor generating unit for generating feature descriptors of the respective objects on the basis of results of the detection by the object detecting unit and results of the tracking by the object tracking unit; a data recording control unit for forming a database from the feature descriptors generated by the descriptor generating unit and the pieces of image data of the objects corresponding to the feature descriptors; an image retrieving unit for retrieving, from the database formed by the data recording control unit, object groups that match a set retrieval condition and form a pair of object groups appearing in pieces of image data obtained by capturing different regions, each of the object groups corresponding to a corresponding one of the regions; a feature extracting unit for extracting a feature to be used for checking, from pieces of image data and feature descriptors of each of the object groups retrieved by the image retrieving unit; and a determining unit for determining whether the object groups forming the pair of object groups are identical to each other, by checking features against each other, each of the features being extracted by the feature extracting unit.

Advantageous Effects of Invention

According to the invention, a determination as to whether objects are identical objects can be made between images shot by a plurality of cameras robustly for changes in features caused by a background or occlusion.

BRIEF DESCRIPTION OF DRAWINGS

FIG. 4 is a flowchart showing the operation of an image recognition process of the image processing device according to the first embodiment.

DESCRIPTION OF EMBODIMENTS

To describe the invention in more detail, a mode for carrying out the invention will be described below with reference to the accompanying drawings.

First Embodiment

Figure 1:
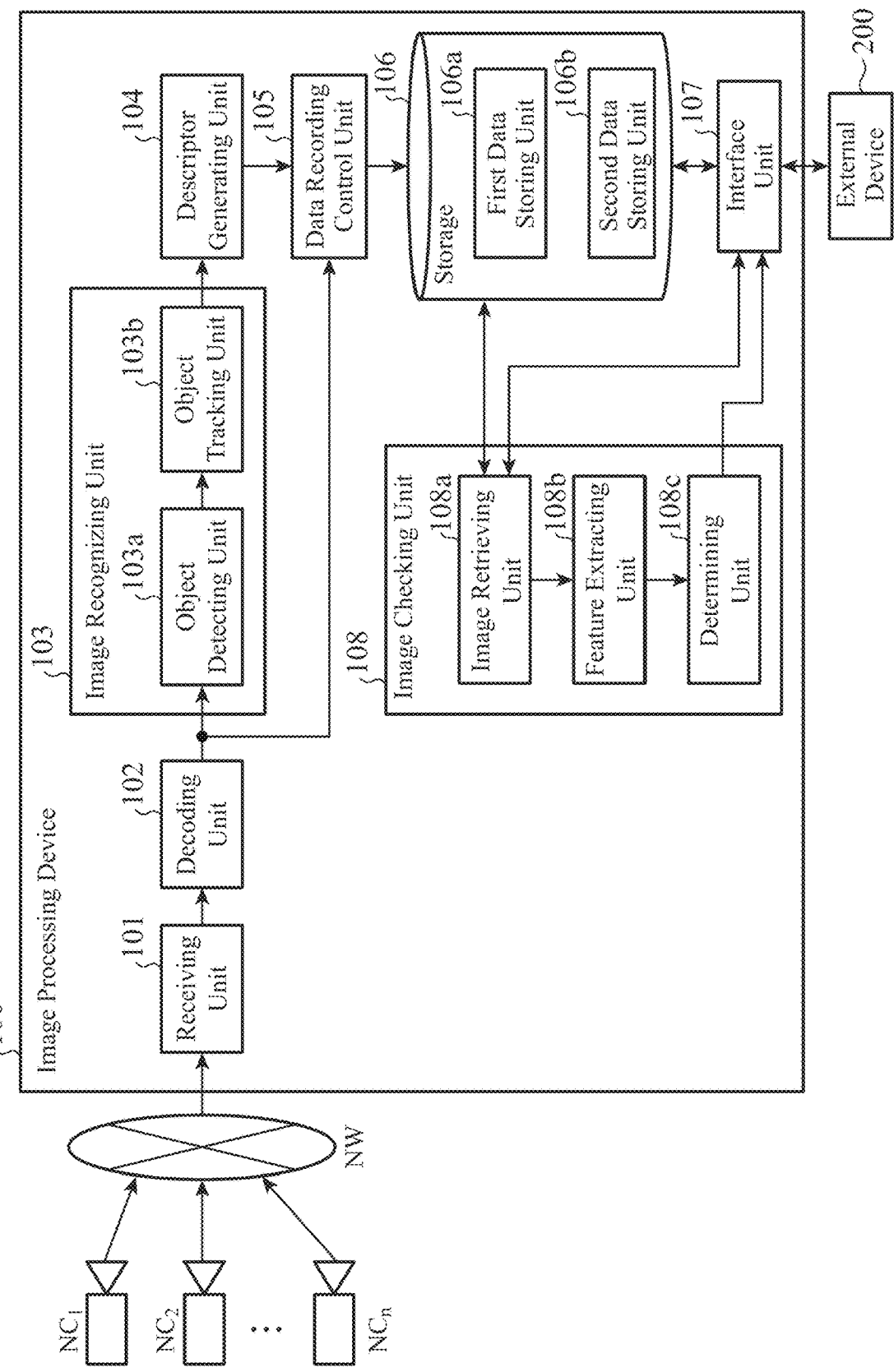
FIG. 1 is a block diagram showing a configuration of an image processing device according to a first embodiment.

FIG. 1 is a block diagram showing a configuration of an image processing system including an image processing device 100 according to a first embodiment.

As shown in FIG. 1, the image processing system includes n network cameras $NC_1$, $NC_2$, ..., (n is an integer greater than or equal to 1); and the image processing device 100 that receives, through a communication network NW, still image data or a moving image stream delivered from each of the network cameras $NC_1$, $NC_2$, ..., $NC_n$. The image processing device 100 performs image analysis on the still image data or moving image data (hereinafter, collectively described as image data) received from the network cameras $NC_1$, $NC_2$, ..., $NC_n$. The image processing device 100 accumulates spatial, geographic, or temporal descriptors representing results of the image analysis in such a manner that the descriptors are associated with images.

Examples of the communication network NW include local area networks such as a wired Local Area Network (LAN) and a wireless LAN, a dedicated network that connects sites, and a wide area network such as the Internet.

The network cameras $NC_1$, $NC_2$, ..., $NC_n$ all have the same configuration. Each network camera NC includes an imaging unit (not shown) that captures an object; and a transmitting unit (not shown) that transmits an output from the imaging unit to the image processing device 100 on the communication network NW. The imaging unit includes an imaging optical system that forms an optical image of an object; a solid-state imaging device that converts the formed optical image into an electrical signal; and an encoder circuit that compresses and encodes the converted electrical signal as still image data or moving image data. For the solid-state imaging device, for example, a Charge-Coupled Device (CCD) or a Complementary Metal-oxide Semiconductor (CMOS) device is used.

In a case in which an output from the solid-state imaging device is to be compressed and encoded as moving image data, each of the network cameras $NC_1$, $NC_2$, ..., $NC_n$ generates a compressed and encoded moving image stream in accordance with a streaming system, e.g., Moving Picture Experts Group 2 Transport Stream (MPEG-2 TS), Real-time Transport Protocol/Real Time Streaming Protocol (RTP/RTSP), MPEG Media Transport (MMT), or Dynamic Adaptive Streaming over HTTP (DASH). Note that the streaming system used in the present embodiment is not limited to MPEG-2 TS, RTP/RTSP, MMT, or DASH. Note that whatever streaming system is used, identification information by which the image processing device 100 can uniquely separate moving image data included in a moving image stream is multiplexed in the moving image stream.

As shown in FIG. 1, the image processing device 100 includes a receiving unit 101, a decoding unit 102, an image recognizing unit 103, a descriptor generating unit 104, a data recording control unit 105, a storage 106, an interface unit 107, and an image checking unit 108.

The receiving unit 101 receives delivered data from the network cameras $NC_1$, $NC_2$, ..., $NC_n$, and separates image data from the received delivered data. Here, the image data includes still image data or a moving image stream. The receiving unit 101 outputs the separated image data to the decoding unit 102.

The decoding unit 102 decodes the compressed and encoded image data which is inputted from the receiving unit 101, in accordance with a compression and encoding system used by the network cameras $NC_1$, $NC_2$, ..., $NC_n$. The decoding unit 102 outputs the decoded image data to the image recognizing unit 103.

The image recognizing unit 103 performs an image recognition process on the image data inputted from the decoding unit 102. The image recognizing unit 103 includes an object detecting unit 103a and an object tracking unit 103b.

The object detecting unit 103a detects objects appearing in a plurality of pieces of temporally continuing image data which are inputted from the decoding unit 102, by analyzing the image data. The object detecting unit 103a obtains the number of the detected objects, visual features of each object, location information of each object, a shooting time of each object, and the like, and outputs the obtained information as results of the detection of objects to the object tracking unit 103b and the descriptor generating unit 104. Here, the visual features of an object are features such as the color of the object, the texture of the object, the shape of the object, the motion of the object, and a face in the object. The object detecting unit 103a also outputs the image data to the object tracking unit 103b.

Figure 2:
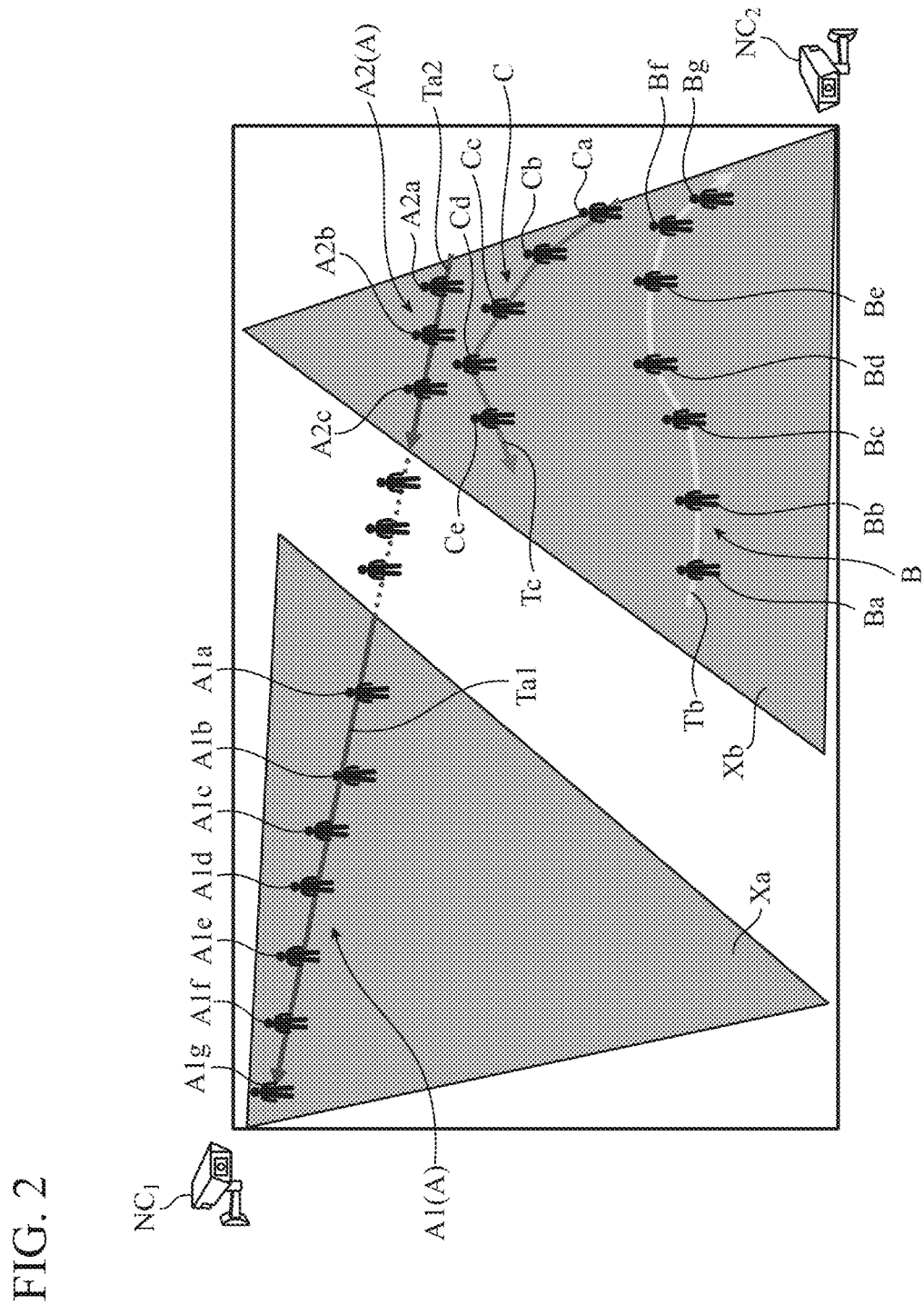
FIG. 2 is a diagram showing an example of a result of image recognition obtained by the image processing device according to the first embodiment.

FIG. 2 is a diagram showing an example of a result of image recognition in the image recognition process of the image processing device 100 according to the first embodiment. FIG. 2 shows a case in which the image processing device 100 has received delivered data from two network cameras $NC_1$ and $NC_2$ that capture a region Xa and a region Xb. In addition, FIG. 2 shows a result of tracking the motion of three people, a person indicated by an object A, a person indicated by an object B, and a person indicated by an object C, between the delivered data.

The object detecting unit 103a detects an object A1a from decoded image data obtained by the network camera $NC_1$. The object detecting unit 103a detects an object A1b from next image data obtained by the network camera $NC_1$. Subsequently, the object detecting unit 103 a detects an object A1c from next image data obtained by the network camera $NC_1$. The object detecting unit 103a detects objects A1a to A1g by continuously performing the above-described detection process.

Likewise, the object detecting unit 103a detects objects A2a to A2c, objects Ba to Bg, and objects Ca to Ce from a plurality of pieces of decoded image data obtained by the network camera $NC_2$. The object detecting unit 103a obtains visual features, location information, shooting times, and the like, of all detected objects (A1a to A1g, A2a to A2c, Ba to Bg, and Ca to Ce).

The object tracking unit 103b tracks the detected objects in a time direction by referring to the results of the detection of objects inputted from the object detecting unit 103a. When the object tracking unit 103b tracks objects in the time direction, the object tracking unit 103b performs tracking by comparing results of detection of objects detected by the object detecting unit 103a within a single piece of image data and between a plurality of pieces of temporally continuing image data. The object tracking unit 103b outputs motion information (optical flow) of the objects which corresponds to results of the tracking of the objects to the descriptor generating unit 104. For example, when an object to be tracked is a person, identical persons that are shot by a single network camera are tracked.

FIG. 2 shows a specific example of a case in which an object to be tracked is a person.

In the case of FIG. 2, the object tracking unit 103b tracks an object A1 (A1a to A1g) having the same features, between pieces of image data obtained by capturing the region Xa. Likewise, the object tracking unit 103b tracks an object A2 (A2a to A2c) having the same features, an object B (Ba to Bg) having the same features, and an object C (Ca to Ce) having the same features, between pieces of image data obtained by capturing the region Xb.

The object tracking unit 103b outputs information indicating, for example, a period of time during which the object A1 has appeared in the image data obtained by capturing the region Xa, periods of time during which the objects A2, B, and C have appeared in the image data obtained by capturing the region Xb, and motion of the objects A1, A2, B, and C, as motion information of the objects A1, A2, B, and C, to the descriptor generating unit 104.

The descriptor generating unit 104 generates spatial descriptors, geographic descriptors, temporal descriptors, or descriptors representing combinations thereof, on the basis of the results of the detection of objects inputted from the object detecting unit 103a and the motion information of the objects inputted from the object tracking unit 103b.

Specifically, the descriptor generating unit 104 converts the results of the detection of objects and the results of the tracking of the objects into feature descriptors in accordance with a predetermined format. The feature descriptors include the number of objects detected by the object detecting unit 103a, visual features of each object, location information of each object, a shooting time of each object, and the like. In addition, the feature descriptors include an identifier indicating that objects are identical objects tracked in the time direction.

The data recording control unit 105 forms a database from the decoded image data which is inputted from the decoding unit 102 and the feature descriptors inputted from the descriptor generating unit 104. The data recording control unit 105 performs control to store the formed database in the storage 106. It is desirable that the data recording control unit 105 store the image data and the feature descriptors in the storage 106 in a format enabling two-way access at high speed to be made. In addition, the data recording control unit 105 may form a database by creating an index table indicating a correspondence relationship between the image data and the feature descriptors. For example, the data recording control unit 105 adds index information so that when a data location of a specific image frame included in image data is provided, a storage location of descriptor data corresponding to the data location in the storage 106 can be identified at high speed. In addition, the data recording control unit 105 may add index information so that a data location corresponding to a storage location in the storage 106 can be identified at high speed.

The storage 106 is formed of, for example, a large-capacity recording medium such as a Hard Disk Drive (HDD) or a flash memory. The storage 106 includes a first data storing unit 106a in which image data is accumulated; and a second data storing unit 106b in which descriptor data is accumulated. Although FIG. 1 shows a configuration in which the first data storing unit 106a and the second data storing unit 106b are provided in the single storage 106, no limitation thereto is intended. For example, the first data storing unit 106a and the second data storing unit 106b may be provided in different storages in a distributed manner.

In addition, although FIG. 1 shows a configuration in which the image processing device 100 includes the storage 106, no limitation to this configuration is intended. The image processing device 100 may be configured in such a manner that the data recording control unit 105 accesses a single or a plurality of network storage devices (not shown) provided on the communication network NW, instead of the storage 106. This enables the data recording control unit 105 to accumulate image data and feature descriptors in the external network storage device(s), thus enabling a database to be constructed outside the image processing device 100.

An external device 200 accesses the database in the storage 106 through the interface unit 107.

When a retrieval condition is set by the external device 200 through the interface unit 107, the image checking unit 108 starts a process. Here, the retrieval condition is area information to be retrieved, time information to be retrieved, the type of object to be retrieved, the determination time of an object to be retrieved, or the like. Specific examples of the retrieval condition include, for example, a condition instructing to retrieve objects whose tracking time as identical objects in a given network camera NC has exceeded a certain period of time, and a condition instructing to retrieve objects that have location information corresponding to an area (e.g., a no-entry area) which is set in advance in a network camera NC.

The image checking unit 108 includes an image retrieving unit 108a, a feature extracting unit 108b, and a determining unit 108c. The image retrieving unit 108a retrieves objects that match a retrieval condition set by the external device 200, by accessing the storage 106. The image retrieving unit 108a narrows down the objects having matched the retrieval condition to pairs of objects to be checked (hereinafter, described as object pairs). An object pair to be checked is a combination of objects each existing in the corresponding one of pieces of image data which are obtained by capturing different regions. In addition, narrowing down to object pairs is performed using appearance time of the objects, movement paths of the objects, and general human walking time which is set in advance. The image retrieving unit 108a outputs the image data and feature descriptors of objects obtained by the retrieval and narrowing down to object pairs, to the feature extracting unit 108b.

In the example of FIG. 2, the image retrieving unit 108a retrieves, for example, the object A1, the object A2, the object B, and the object C as objects that match a retrieval condition. Furthermore, the image retrieving unit 108a performs narrowing down to object pairs, each of which consists of objects captured by different network cameras NC, and thereby excludes the object B whose moving direction is different than that of the object A1 from the objects. The image retrieving unit 108a outputs the image data and feature descriptors of the retrieved object A1, object A2, and object C to the feature extracting unit 108b.

Using the image data and descriptor data of the objects inputted from the image retrieving unit 108a, the feature extracting unit 108b performs feature-based clustering between a plurality of pieces of image data of each object. Using the result of the clustering, the feature extracting unit 108b defines one of clusters whose number of images included therein is largest, as a cluster that characterizes the object. The feature extracting unit 108b extracts a feature to be used to check objects from pieces of image data included in the defined cluster. The feature extracting unit 108b extracts a feature to be used to check objects by, for example, the same technique as that disclosed in the above-described Non-Patent Literature 1 or Non-Patent Literature 2. A feature obtained by the technique disclosed in each of Non-Patent Literature 1 and Non-Patent Literature 2 is N-dimensional vector data. The feature extracting unit 108b calculates N-dimensional vector data for each of the pieces of image data included in the cluster. Then, the feature extracting unit 108b averages the pieces of N-dimensional vector data for all the pieces of image data included in the cluster, or selects vector data representing the largest value, and thereby extracts one feature for the cluster. The feature extracting unit 108b outputs the extracted feature to the determining unit 108c.

The determining unit 108c determines whether objects are identical to each other by comparing features of the objects that form an object pair among the features inputted from the feature extracting unit 108b. The determining unit 108c records results of the determination as descriptors in a buffer (not shown), etc., and outputs the results of the determination to the external device 200 through the interface unit 107.

In the case of the example of FIG. 2, the determining unit 108c makes a comparison between features of the object A1 and the object A2 which form an object pair consisting of objects captured by different network cameras NC, and a comparison between features of the object A1 and the object C which form an object pair consisting of objects captured by different network cameras NC. The determining unit 108c determines that the features of the object A1 and the object A2 are identical to each other. In addition, the determining unit 108c determines that the feature of the object A1 is not identical to the feature of the object C.

Next, exemplary hardware configurations of the image processing device 100 will be described.

Figure 3A:
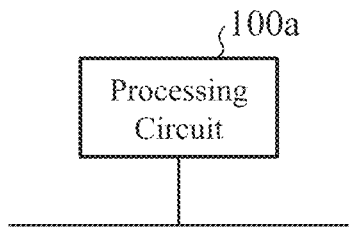
FIGS. 3A and 3B are diagrams showing exemplary hardware configurations of the image processing device according to the first embodiment.
Figure 3B:
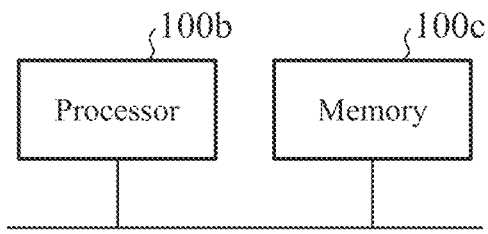

FIGS. 3A and 3B are diagrams showing exemplary hardware configurations of the image processing device 100.

Functions of the receiving unit 101, the decoding unit 102, the image recognizing unit 103, the descriptor generating unit 104, the data recording control unit 105, the interface unit 107, and the image checking unit 108 in the image processing device 100 are implemented by a processing circuit. Namely, the image processing device 100 includes a processing circuit for implementing each of the above-described functions. The processing circuit may be, as shown in FIG. 3A, a processing circuit 100a which is dedicated hardware, or may be, as shown in FIG. 3B, a processor 100b that executes programs stored in a memory 100c.

When the receiving unit 101, the decoding unit 102, the image recognizing unit 103, the descriptor generating unit 104, the data recording control unit 105, the interface unit 107, and the image checking unit 108 are dedicated hardware as shown in FIG. 3A, the processing circuit 100a corresponds, for example, to a single circuit, a combined circuit, a programmed processor, a parallel programmed processor, an Application Specific Integrated Circuit (ASIC), a Field-programmable Gate Array (FPGA), or a combination thereof. The function of each of the receiving unit 101, the decoding unit 102, the image recognizing unit 103, the descriptor generating unit 104, the data recording control unit 105, the interface unit 107, and the image checking unit 108 may be implemented by a processing circuit, or the functions of the respective units may be collectively implemented by a single processing circuit.

When the receiving unit 101, the decoding unit 102, the image recognizing unit 103, the descriptor generating unit 104, the data recording control unit 105, the interface unit 107, and the image checking unit 108 are the processor 100b as shown in FIG. 3B, the functions of the respective units are implemented by software, firmware, or a combination of software and firmware. The software or firmware is described as programs and stored in the memory 100c. The processor 100b implements functions of the receiving unit 101, the decoding unit 102, the image recognizing unit 103, the descriptor generating unit 104, the data recording control unit 105, the interface unit 107, and the image checking unit 108 by reading and executing the programs stored in the memory 100c. Namely, the receiving unit 101, the decoding unit 102, the image recognizing unit 103, the descriptor generating unit 104, the data recording control unit 105, the interface unit 107, and the image checking unit 108 include the memory 100c for storing programs that cause each step shown in FIGS. 4 and 5 which will be described later to be consequently performed when executed by the processor 100b. In addition, it can also be said that the programs cause a computer to perform procedures or methods for the receiving unit 101, the decoding unit 102, the image recognizing unit 103, the descriptor generating unit 104, the data recording control unit 105, the interface unit 107, and the image checking unit 108.

Here, the processor 100b is, for example, a Central Processing Unit (CPU), a processing device, an arithmetic unit, a processor, a microprocessor, a microcomputer, or a Digital Signal Processor (DSP).

The memory 100c may be, for example, a nonvolatile or volatile semiconductor memory such as a Random Access Memory (RAM), a Read Only Memory (ROM), a flash memory, an Erasable Programmable ROM (EPROM), or an Electrically EPROM (EEPROM), a magnetic disk such as a hard disk or a flexible disk, or an optical disc such as a MiniDisc, a Compact Disc (CD), or a Digital Versatile Disc (DVD).

Note that a part of the functions of the receiving unit 101, the decoding unit 102, the image recognizing unit 103, the descriptor generating unit 104, the data recording control unit 105, the interface unit 107, and the image checking unit 108 may be implemented by dedicated hardware, and another part of the functions may be implemented by software or firmware. As such, the processing circuit 100a in the image processing device 100 can implement each of the above-described functions by hardware, software, firmware, or a combination thereof.

Next, the operation of the image processing device 100 will be described.

First, the image recognition process of the image processing device 100 will be described with reference to FIG. 4.

FIG. 4 is a flowchart showing the operation of the image recognition process of the image processing device 100 according to the first embodiment.

The receiving unit 101 receives delivered data from the network cameras $NC_1, NC_2, \ldots, NC_n$ and separates image data (step ST1), and outputs the image data to the decoding unit 102. The decoding unit 102 decodes the image data separated at step ST1 (step ST2), and outputs the decoded image data to the image recognizing unit 103.

The object detecting unit 103a in the image recognizing unit 103 attempts to detect objects appearing in the image data decoded at step ST2 (step ST3). Here, the objects to be detected are moving objects to be tracked such as automobiles, bicycles, and pedestrians. The object detecting unit 103a determines whether objects have been detected (step ST4). If objects have not been detected (step ST4; NO), the flowchart returns to the process at step ST1.

On the other hand, if objects have been detected (step ST4; YES), the object detecting unit 103a obtains the visual features, location information, shooting times, and the like, of the detected objects (step ST5). The object detecting unit 103a outputs image data of the detected objects and the obtained visual features, location information, shooting times, and the like, of the objects as results of the detection to the object tracking unit 103b and the descriptor generating unit 104.

The object tracking unit 103b assigns different IDs to respective objects detected in one image frame, by referring to the image data of the objects inputted from the object detecting unit 103a (step ST6). From image data of each object detected in one frame, the object tracking unit 103b extracts motion information of the object (step ST7). The object tracking unit 103b determines whether an object inputted from the object detecting unit 103a is identical to an object detected from a past image frame that temporally continues to the object inputted from the object detecting unit 103a, by referring to the visual features of the objects obtained at step ST5 and the motion information of the objects extracted at step ST7 (step ST8). If it is determined that the objects are not identical to each other (step ST8; NO), processing proceeds to a process at step ST10.

On the other hand, if it is determined that the objects are identical to each other (step ST8; YES), the object tracking unit 103b rewrites an ID assigned at step ST6 by an ID assigned to the past identical object (step ST9). The object tracking unit 103b determines whether a process has been performed on all objects inputted from the object detecting unit 103a (step ST10). If a process has not been performed on all objects (step ST10; NO), the flowchart returns to the process at step ST7. On the other hand, if a process has been performed on all objects (step ST10; YES), the object tracking unit 103b outputs the IDs of the objects and the motion information of the objects to the descriptor generating unit 104 (step ST11).

The descriptor generating unit 104 generates descriptors on the basis of the visual features, location information, and shooting times of the objects inputted from the object detecting unit 103a, and the IDs of the objects and the motion information of the objects which are inputted from the object tracking unit 103b at step ST11 (step ST12). The descriptor generating unit 104 outputs the generated descriptors to the data recording control unit 105. The data recording control unit 105 performs control to store the descriptors generated at step ST12 and the image data decoded at step ST2 in the storage 106 in such a manner that the descriptors and the image data are associated with each other (step ST13), and ends the process.

Next, an image checking process of the image processing device 100 will be described with reference to FIG. 5.

Figure 5:
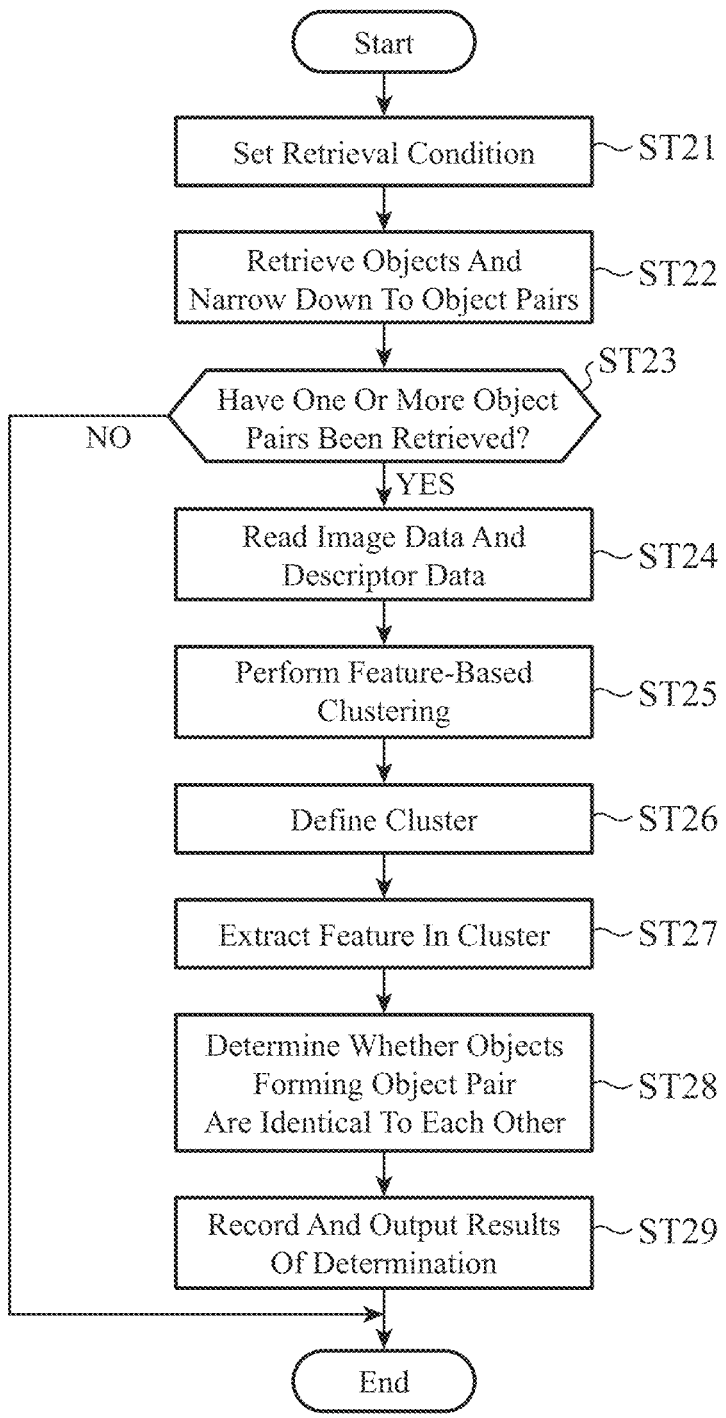
FIG. 5 is a flowchart showing the operation of an image checking process of the image processing device according to the first embodiment.

FIG. 5 is a flowchart showing the operation of the image checking process of the image processing device 100 according to the first embodiment. Note that although the following describes a process assumed to be performed when object pairs are retrieved between two pieces of image data captured by two network cameras, it can also be likewise applied to a process for retrieving object pairs between three or more pieces of image data.

When a retrieval condition is set by the external device 200 through the interface unit 107 (step ST21), the image retrieving unit 108a searches the storage 106 to retrieve objects that match the set retrieval condition, and narrows down the objects to object pairs (step ST22). The image retrieving unit 108a determines whether one or more object pairs, each of which consists of objects captured by different network cameras NC, have been retrieved (step ST23). If one or more object pairs have not been retrieved (step ST23; NO), the image retrieving unit 108a ends the process.

On the other hand, if one or more object pairs have been retrieved (step ST23; YES), the image retrieving unit 108a reads the image data and descriptor data of the retrieved one or more object pairs from the storage 106 (step ST24). The image retrieving unit 108a outputs the read image data and descriptor data to the feature extracting unit 108b. The feature extracting unit 108b performs feature-based clustering between pieces of image data of each object, using the image data and descriptor data read at step ST24 (step ST25). The feature extracting unit 108b defines a cluster that characterizes each object (step ST26). The feature extracting unit 108b extracts a feature from the pieces of image data in the cluster defined at step ST26 (step ST27). The feature extracting unit 108b outputs the extracted feature to the determining unit 108c.

The determining unit 108c determines whether objects forming an object pair are identical to each other, by comparing the features extracted at step ST27 (step ST28). The determining unit 108c stores results of the determination at step ST28 in the buffer, etc., and outputs the results of the determination to the external device 200 through the interface unit 107 (step ST29), and ends the process.

Next, each process of the flowchart of FIG. 5 will be described with reference to the example shown in FIG. 2.

At step ST21, the external device 200 sets a retrieval condition, for example, "a person staying for a certain period of time or more in areas shot by the network camera $NC_1$ and the network camera $NC_2$".

At step ST22, the image retrieving unit 108a searches the storage 106 to retrieve objects that match the retrieval condition "a person staying for a certain period of time or more in areas shot by the network camera $NC_1$ and the network camera $NC_2$".

As described above, the storage 106 stores therein the IDs, visual features, location information, shooting times, IDs of objects, and motion information of objects in such a manner that they are associated with image data of the objects. In the example of FIG. 2, a time at which a new ID is assigned to the object A1 which is a person detected by the network camera $NC_1$ and tracked corresponds to a time at which the object A1a which is a corresponding person has appeared in an image captured by the network camera $NC_1$. In addition, the objects (A1b to A1g) each of which is a person assigned the same ID as the new ID are objects tracked as identical objects. Thus, a period of time during which the same ID as the new ID is assigned corresponds to a period of time during which the corresponding objects have stayed in images captured by the network camera. In addition, an arrow Ta1 shown in FIG. 2 is an arrow indicating a movement path of the object A1. The movement path of the object A1 is estimated from the location information of the objects (A1a to A1g) tracked as identical objects.

At step ST23, the image retrieving unit 108a retrieves four objects (the object A1, the object A2, the object B, and the object C) that match the retrieval condition. In addition, at step ST23, the image retrieving unit 108a narrows down the objects to object pairs, and thereby excludes the object B and detects three objects (the object A1, the object A2, and the object C) (step ST23; YES).

At step ST24, the image retrieving unit 108a reads the image data and descriptor data of the object A1, the object A2, and the object C from the storage 106. At step ST25, the feature extracting unit 108b performs clustering using features of the object A1, clustering using features of the object A2, and clustering using features of the object C. At step ST26, the feature extracting unit 108b defines a cluster for each of the object A1, the object A2, and the object C. At step ST27, the feature extracting unit 108b extracts a feature from the image data in the defined cluster.

At step ST28, the determining unit 108c determines that the object A1 and the object A2 that form an object pair are identical to each other, using the visual features and the features of the image data of the object A1, the object A2, and the object C. In addition, the determining unit 108c determines that the object A1 and the object C that form an object pair are not identical to each other. At step ST29, the determining unit 108c records a result of determination that the object A1 and the object A2 are identical objects, a result of determination that the object A1 and the object B are not identical objects, and a result of determination that the object A1 and the object C are not identical objects in the buffer, etc., and outputs the results of determination to the external device 200.

FIG. 6 is a diagram showing exemplary image data of persons tracked as objects in a checking process of the image processing device 100 according to the first embodiment.

Figure 6A:
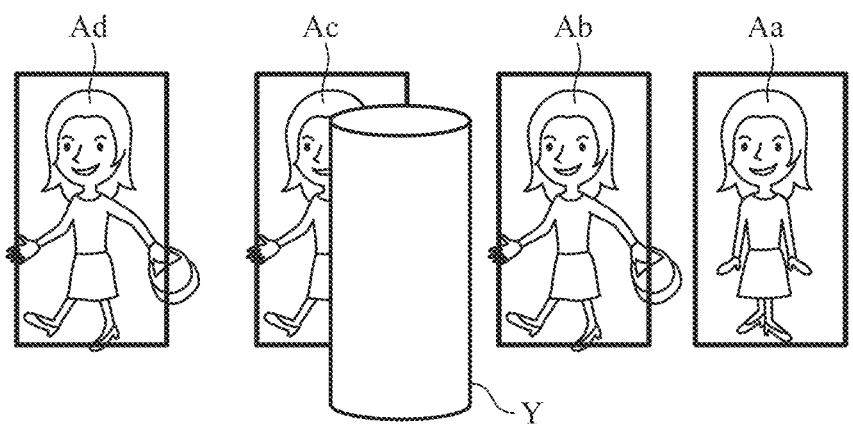
FIGS. 6A and 6B are diagrams showing exemplary image data of persons tracked as objects in a checking process of the image processing device according to the first embodiment.
Figure 6B:
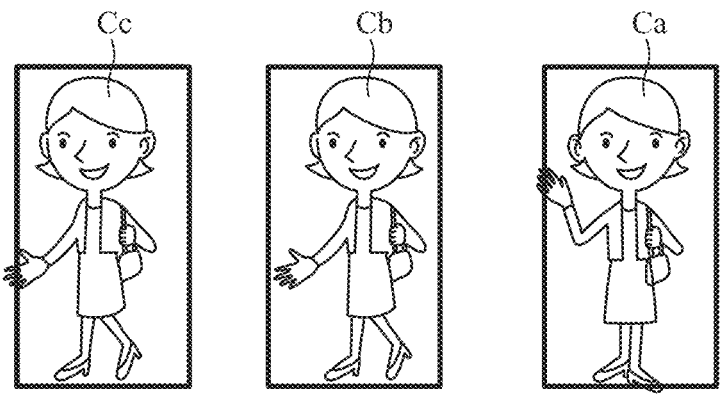

FIG. 6A is a diagram showing image data of the object A shown in FIG. 2, and FIG. 6B is a diagram showing image data of the object C shown in FIG. 2.

As shown in FIG. 6A, even if pieces of image data are obtained by tracking the same object A, a part of the object A may be hidden by, for example, an obstacle Y. In addition, even if pieces of image data are obtained by tracking the same object A, when, for example, the posture of the object has been changed, captured images differ in content from each other. Hence, when one of four pieces of image data of the object A shown in FIG. 6A (e.g., a piece of image data obtained by capturing an object Ac) is selected and compared with a piece of image data selected from three pieces of image data of the object C of FIG. 6B (e.g., a piece of image data obtained by capturing an object Cb), the checking accuracy of the image checking unit 108 decreases due to the dependence on the selected pieces of image data.

Hence, the image checking unit 108 defines a cluster using, for example, four pieces of image data shown in FIG. 6A, and extracts a feature from the pieces of image data in the defined cluster. Likewise, the image checking unit 108 defines a cluster using, for example, three pieces of image data shown in FIG. 6B, and extracts a feature from the pieces of image data in the defined cluster. The determining unit 108c compares the extracted feature of the object A with the extracted feature of the object C, by which a result of determination can be restrained from depending on image data.

As described above, the first embodiment includes the object detecting unit 103a that detects objects each appearing in a corresponding one of pieces of image data, by analyzing the pieces of image data; the object tracking unit 103b that tracks the detected objects in a time direction; the descriptor generating unit 104 that generates feature descriptors of the respective objects on the basis of results of the detection and results of the tracking of the objects; the data recording control unit 105 that forms a database from the generated feature descriptors and the pieces of image data of the objects corresponding to the feature descriptors; the image retrieving unit 108a that retrieves, from the database, object groups that match a set retrieval condition and form a pair of object groups appearing in pieces of image data obtained by capturing different regions, each of the object groups corresponding to a corresponding one of the regions; the feature extracting unit 108b that extracts a feature to be used for checking, from pieces of image data and feature descriptors of each of the retrieved object groups; and the determining unit 108c that determines whether the object groups forming the pair of object groups are identical to each other, by checking the extracted features against each other. Thus, a determination as to whether objects are identical objects can be made between images shot by a plurality of cameras robustly for changes in features caused by a background or occlusion.

In addition, according to the first embodiment, the feature extracting unit performs feature-based clustering between pieces of image data of each of the retrieved object groups, using the pieces of image data and the feature descriptors of a corresponding one of the retrieved object groups, and extract the feature from pieces of image data in a cluster defined by a result of the clustering. Thus, a reduction in checking accuracy due to the dependence on image data can be restrained.

INDUSTRIAL APPLICABILITY

An image processing device according to the invention is suitable for use in, for example, an object recognition system including a surveillance system, or an image retrieval system.

REFERENCE SIGNS LIST

100: image processing device, 101: receiving unit, 102: decoding unit, 103: image recognizing unit, 103a: object detecting unit, 103b: object tracking unit, 104: descriptor generating unit, 105: data recording control unit, 106: storage, 106a: first data storing unit, 106b: second data storing unit, 107: interface unit, 108: image checking unit, 108a: image retrieving unit, 108b: feature extracting unit, and 108c: determining unit.

The invention claimed is:

1. An image processing device comprising:
   processing circuitry
   to detect objects each appearing in a corresponding one of pieces of image data, by analyzing the pieces of image data;
   to track the objects detected, in a time direction;
   to generate feature descriptors of the respective objects on a basis of results of the detection and results of the tracking;
   to form a database from the feature descriptors generated and the pieces of image data of the objects corresponding to the feature descriptors;
   to retrieve, from the database formed, object groups that match a set retrieval condition and form a pair of object groups appearing in pieces of image data obtained by capturing different regions, each of the object groups corresponding to a corresponding one of the regions;
   to extract a feature to be used for checking, from pieces of image data and feature descriptors of each of the object groups retrieved; and
   to determine whether the object groups forming the pair of object groups are identical to each other, by checking features against each other, each of the features being extracted, wherein the processing circuitry performs feature-based clustering between the pieces of image data of each of the retrieved object groups, using the pieces of image data and the feature descriptors of a corresponding one of the object groups retrieved, and extracts, from pieces of image data in a cluster defined by a result of the clustering, one feature for the cluster, the one feature being the feature to be used for checking.

2. The image processing device according to claim 1, wherein each of the feature descriptors includes a visual feature of a corresponding one of the objects and location information of the corresponding one of the objects.

3. An image processing method comprising:
   detecting objects each appearing in a corresponding one of pieces of image data by analyzing the pieces of image data;
   tracking the detected objects in a time direction;
   generating feature descriptors of the respective detected objects on a basis of results of the detection of the objects and results of the tracking of the detected objects;
   forming a database from the generated feature descriptors and the pieces of image data of the objects corresponding to the feature descriptors;
   retrieving, from the formed database, object groups that match a set retrieval condition and form a pair of object groups appearing in pieces of image data obtained by capturing different regions, each of the object groups corresponding to a corresponding one of the regions;
   extracting a feature to be used for checking, from pieces of image data and feature descriptors of each of the retrieved object groups;
   determining whether the object groups forming the pair of object groups are identical to each other, by checking features against each other, each of the features being extracted; and
   performing feature-based clustering between the pieces of image data of each of the retrieved object groups, using the pieces of image data and the feature descriptors of a corresponding one of the retrieved object groups, and extracting, from pieces of image data in a cluster defined by a result of the clustering, one feature for the cluster, the one feature being the feature to be used for checking.

* * * * *